(12) United States Patent
Gillet

(10) Patent No.: US 10,603,834 B2
(45) Date of Patent: Mar. 31, 2020

(54) STATION FOR FORMING A CONTAINER OPERABLE IN AN INJECTION CONFIGURATION AND IN A DISPLACEMENT CONFIGURATION

(71) Applicant: DISCMA AG, Hunenberg (CH)

(72) Inventor: Denis Gillet, Octeville sur Mer (FR)

(73) Assignee: Discma AG, Zürich (CH)

( * ) Notice: Subject to any disclaimer, the term of this patent is extended or adjusted under 35 U.S.C. 154(b) by 244 days.

(21) Appl. No.: 14/904,253

(22) PCT Filed: Jul. 11, 2014

(86) PCT No.: PCT/EP2014/064934
§ 371 (c)(1),
(2) Date: Jan. 11, 2016

(87) PCT Pub. No.: WO2015/004272
PCT Pub. Date: Jan. 15, 2015

(65) Prior Publication Data
US 2016/0243747 A1 Aug. 25, 2016

(30) Foreign Application Priority Data

Jul. 12, 2013 (EP) .................................... 13306000

(51) Int. Cl.
| | |
|---|---|
| *B29C 49/58* | (2006.01) |
| *B29C 49/46* | (2006.01) |
| *B29C 49/12* | (2006.01) |
| *B29C 49/28* | (2006.01) |

(Continued)

(52) U.S. Cl.
CPC .............. *B29C 49/58* (2013.01); *B29C 49/12* (2013.01); *B29C 49/28* (2013.01);
(Continued)

(58) Field of Classification Search
CPC ... B29C 2049/465; B29C 49/58; B29C 49/46; B29C 2049/4602; B29C 2049/4652;
(Continued)

(56) References Cited

U.S. PATENT DOCUMENTS

| | | | | |
|---|---|---|---|---|
| 4,039,641 A | * | 8/1977 | Collins | ............... B29C 49/0005 264/28 |
| 2004/0009257 A1 | * | 1/2004 | Galloni | ................... B29C 49/12 425/529 |

(Continued)

FOREIGN PATENT DOCUMENTS

EP    1529620 A1    5/2005

*Primary Examiner* — Robert C Dye
*Assistant Examiner* — Sonny V Nguyen
(74) *Attorney, Agent, or Firm* — Eric J. Sosenko; Jonathan P. O'Brien; Honigman LLP

(57) ABSTRACT

A station for forming a container from a preform. The station having a main body including a preform seat adapted to receive a preform and an injection assembly. The injection assembly including an injection nozzle, comprising an inlet and an outlet, that is movable between a retracted position and an injection position. An injection device arranged to inject liquid to the inlet of the injection nozzle. The injection device includes a housing, defining a main chamber having an actuation aperture, and a closing element movable relative to the housing and closing the actuation aperture. The injection nozzle and the housing of the injection device are rigidly fixed to each other so as to form a single unit.

13 Claims, 5 Drawing Sheets

(51) Int. Cl.
  *B29C 49/42* (2006.01)
  *B29C 49/64* (2006.01)
  *B29C 49/78* (2006.01)
  B29K 105/00 (2006.01)
  B29L 31/00 (2006.01)
(52) U.S. Cl.
  CPC .......... *B29C 49/4289* (2013.01); *B29C 49/46* (2013.01); *B29C 49/6409* (2013.01); *B29C 49/78* (2013.01); B29C 2049/4294 (2013.01); B29C 2049/465 (2013.01); B29C 2049/4655 (2013.01); B29C 2049/4664 (2013.01); B29C 2049/4694 (2013.01); B29C 2049/5858 (2013.01); B29C 2049/5862 (2013.01); B29K 2105/258 (2013.01); B29L 2031/712 (2013.01)
(58) Field of Classification Search
  CPC .... B29C 2049/4655; B29C 2049/2049; B29C 2049/4698; B29C 2049/4294; B29C 2049/5862; B29C 2049/5865; B29C 2049/5872; B29C 2049/5875; B29C 2049/5879; B29C 2049/5882; B29C 49/4236

USPC .......................................... 264/523; 425/574
See application file for complete search history.

(56) References Cited

U.S. PATENT DOCUMENTS

| | | | |
|---|---|---|---|
| 2005/0206045 A1* | 9/2005 | Desanaux | B29C 49/46 264/535 |
| 2008/0286402 A1* | 11/2008 | Mie | B29C 49/58 425/525 |
| 2010/0252945 A1* | 10/2010 | Eudier | B29C 49/12 264/40.5 |
| 2010/0301523 A1 | 12/2010 | Gillet et al. | |
| 2011/0285063 A1 | 11/2011 | Chauvin et al. | |
| 2012/0315350 A1 | 12/2012 | Andison et al. | |
| 2013/0122136 A1* | 5/2013 | Fevre | B29C 49/46 425/535 |
| 2013/0213240 A1* | 8/2013 | O'Brien | A47J 31/38 99/297 |
| 2016/0144550 A1* | 5/2016 | Kumar | B29C 49/46 264/524 |

* cited by examiner

STATION FOR FORMING A CONTAINER OPERABLE IN AN INJECTION CONFIGURATION AND IN A DISPLACEMENT CONFIGURATION

CROSS-REFERENCE TO RELATED APPLICATIONS

This application is the U.S. National phase of PCT application no. PCT/EP2014/064934 filed on Jul. 11, 2014, which claims priority to EP13306000.4 filed on Jul. 12, 2013, the disclosures of which are incorporated in their entirety by reference herein.

TECHNICAL FIELD OF THE INVENTION

The present invention relates to a station and to a method for forming a container from a preform, in particular by injecting a liquid in the preform using an injection assembly.

The invention relates to the field, known ashydraulic blow molding, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like eatable oil or soup), or a high viscosity (like yogurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

In this technical field of forming containers, hygiene is a very important issue in order to prevent any risk of contamination of the content of the containers, for example bottles with products that are to be ingested by consumers or applied on the skin of a consumer. Consequently, the cleaning of the stations for forming the containers and of their components is a fundamental issue.

In such stations, the injection assembly comprises at least a movable outlet in order to allow easy placing of a preform in the station and retrieving of a formed container from the station and to allow placing the outlet of the injection device in fluidic communication with the preform to inject the fluid inside the preform. To this end, the outlet is made part of a housing which is movable relative to a main body, for example formed by a carrousel, and which is able to receive the fluid from a fluid source via an injection device, attached to the main body and arranged to inject the fluid inside the movable housing to the outlet. In order to prevent any leaking of fluid between the movable housing and the main body and to ensure a proper flow of the fluid between the source and the outlet, sealing means are needed between the movable housing and the main body. Documents WO-2010/003873 and EP-1 529 620 for example disclose such injection devices.

For such injection devices, dynamic sealing means are necessary. These dynamic sealing means provide liquid tight contact between the main body and the sliding housing. For example, some dynamic seal means may include seal rings maintained in place inside a circular receiving groove of the main body. As the movement of the housing has to be allowed, the seal ring can move inside the receiving groove. The dynamic sealing means are in contact with the fluid to be injected, are hard to clean. Cleaning of dynamic sealing means may require a dismantlement of the injection device or several inlets for cleaning products, in order to ensure that the cleaning products properly reach and clean the sealing means. For example, the receiving groove may be a bacteria trap and cleaning it may require to remove the seal rings. Consequently, the cleaning of the injection device is complicated and time consuming, which reduces the throughput of the station.

Document US 2012/0315350 shows a station comprising a blow nozzle and a pressure source movable between a retracted position and an injection position, wherein the blow nozzle forms a seal on the finish of the preform. However, this document does not specify how the blow nozzle is moved between the retracted position and the injection position.

One of the aims of the invention is to simplify the cleaning of an injection assembly and guarantying a proper cleaning of all its components via a single cleaning path and without having to dismantle the injection device. Another aim of the invention is to provide an injection assembly able to sustain high pressures of liquid flowing in the injection assembly.

SUMMARY OF THE INVENTION

To this end, the invention relates to a station for forming a container from a preform comprising a main body including a preform seat adapted to receive the preform and an injection assembly, the injection assembly comprising:
- an injection nozzle comprising an inlet and an outlet, the injection nozzle being movable between a retracted position and an injection position relative to the preform seat, the outlet being designed to be placed in fluidic communication with the preform when the injection nozzle is in the injection position, and
- an injection device arranged to inject liquid from a liquid source to the inlet of the injection nozzle, the injection device comprising a housing, defining a main chamber having an actuation aperture, and a closing element movable relative to the housing and closing the actuation aperture in a fluid tight manner,—a valve system operable by control means in a closed state, wherein the fluidic communication between the outlet and the main chamber is interrupted such that the main chamber, the closing element and the valve system in closed state delimit a closed volume,
- wherein the injection nozzle and the housing of the injection device are rigidly fixed to each other such as to form a single unit movable between the retracted position and the injection position, the station further comprising an actuator arranged to move the closing element with respect to the main body, the control means being able to put the station in a displacement configuration, wherein the valve system is in the closed state, the closed volume is filled with liquid and the actuator moves the closing element, causing the housing and the injection nozzle to move accordingly.

With the station according to the invention, there is no need to provide dynamic sealing elements between the injection device and the outlet because the injection device forms a single unit with the injection nozzle. The injection assembly may comprise some static sealing means, but static sealing means easy to clean currently exist in the market. For example, static sealing means may comprise a seal disc compressed between two different spare parts. As there is no movement between these parts of the assembly, the space receiving the seal disc may totally be filled by the compressed seal disc, thereby leaving no space where bacteria could be trapped. Consequently, it is possible to clean the injection assembly of the above station in one single cleaning step simply by replacing the fluid to be injected by cleaning products. Therefore, the injection assembly can be cleaned easily, without having to dismantle the injection assembly or stop the machine in which the station is used. Furthermore, by rigidly fixing the injection device to the injection nozzle, for example via a rigid duct, the injection assembly can sustain an important pressure of the fluid circulating in the assembly, which makes it possible to have an important pressure at the outlet of the injection device since there is no relative displacement between the injection nozzle and the injection device. Such an important pressure is particularly advantageous in an hydro forming process, wherein the injected liquid is used to shape a preform into a container and is injected at a high pressure, for example up to 40 bars. Furthermore, the closing element is used both for injecting the liquid in the preform and for moving the injection device between the retracted position and the injection position. The station according to the invention is therefore less complex and less cumbersome relative to conventional stations wherein separate means are provided to move the injection nozzle and to inject the liquid.

It should be noted that document US 2012/0315350 shows in FIG. 2 that the piston-like device of the pressure source moves upward to draw liquid in the cylinder of the pressure source, while the blow nozzle is moved down to form a seal on the finish of the preform, which means that another element than the piston-like device has been used to move the blow nozzle down while the piston-like device is move upward. Consequently, in the injection device described in US 2012/0315350, the means for moving the injection device are separate from the means to inject the liquid. Furthermore, this document does not disclose that the blow nozzle may be rigidly fixed to the pressure source.

According to particular features of the injection assembly according to the invention:
the valve system is further operable by the control means between at least:
a filling state arranged to place the main chamber in fluidic communication with the liquid source such as to fill the main chamber with the liquid,
an injection state, arranged to place the main chamber in fluidic communication with the outlet of the injection nozzle, and
the closed state;
the station further comprises a retraction stop defining the retracted position of the injection nozzle, the control means being able to put the station in a filling configuration, wherein the valve system is in the filling state, the injection nozzle is urged against the retraction stop and the actuator moves the closing element in a filling direction causing the main chamber to be filled with liquid from the liquid source;
the station further comprises maintaining means arranged to maintain the injection nozzle and the housing of the injection device in the injection position, the control means being able to put the station in an injection configuration wherein the valve system is in the injection state, the maintaining means are actuated and the actuator moves the closing element in an injection direction.

The maintaining means guaranty a stabilization of the injection assembly in the injection position even under an important pressure of the liquid injected in the container. Therefore, when the valve system is placed in the injection state and the liquid starts flowing at a high pressure in the preform, the outlet of the injection nozzle is firmly maintained in fluid tight contact with the preform and there is no risk of spilling liquid outside the preform and the injection assembly.

The maintaining means do not interact with the liquid to be injected by the station. The maintaining means further make it possible to use the same actuator to inject the liquid in the container and to move the injection assembly. Consequently there is no need to provide a separate actuator to move the injection nozzle. The structure of the injection assembly is therefore simplified since the number of components forming the injection assembly is reduced.

According to other features of the injection assembly:
the valve system comprises a downstream valve element, located between the inlet of the injection nozzle and an outlet of the main chamber or located inside the injection nozzle, the downstream valve element being an actuable valve operable by the control means;
the valve system comprises an upstream valve element, located between the liquid source and an inlet of the main chamber of the injection device, the upstream valve element being an actuable valve operable by the control means;
the closing element is formed by a rigid piston, arranged to slide in the actuation aperture;
the closing element is formed by an elastic membrane; and
the station further comprises guiding means for guiding the movement of the injection nozzle and of the housing relative to the main body.

The invention also relates to a machine for forming containers from a preforms, the machine comprising a carousel carrying a plurality of stations as described above and moving them in rotation during the forming step such that formed containers are produced continuously.

The invention also relates to a method for forming a container from a preform using a station as described above, the method comprising a step of introducing a preform in the preform seat while the injection nozzle is in its retracted position, the method further comprising a displacement phase including moving the injection nozzle into the injection position, wherein the displacement phase comprises placing the valve system in the closed state and actuating the actuator to move the closing element causing the injection nozzle and the injection device to be moved simultaneously.

The liquid source may provide liquid at substantially the atmospheric pressure. The injection device may provide a high pressure of liquid, 40 bars for example. The fact that the injection nozzle is moved simultaneously with the injection device makes the station easier to clean because there is no relative movement between parts that receive liquid at a high pressure. As previously explained, static seal means may be used instead of dynamic seal means.

According to other features of the method according to the invention:
the method includes a filling phase prior to the displacement phase, the filling phase comprising placing the valve system in the filling state and moving the closing element in a filling direction such that the closed volume is filled with liquid;
the method includes, after the displacement phase, an injection phase comprising a maintaining phase during which the injection assembly is maintained in the injection position such that the outlet of the injection nozzle is maintained in fluidic communication with the preform, the method further comprising successively, during the maintaining phase:

placing the valve system in the injection state, and then, moving the closing element in an injection direction such that the liquid is injected from the main chamber to the preform through the outlet; and the preform introduced in the preform seat has been previously heated at a temperature above the preform material glass transition temperature, and wherein moving the closing element during the injection phase, includes exerting a force on the closing element strong enough to generate a liquid pressure suitable for deforming the heated preform

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the following description, the terms "upper" and "lower" are defined relative to axis A, which corresponds to the axis of a container to be produced and which extends substantially vertically when the container is placed on its bottom.

Figure 1:
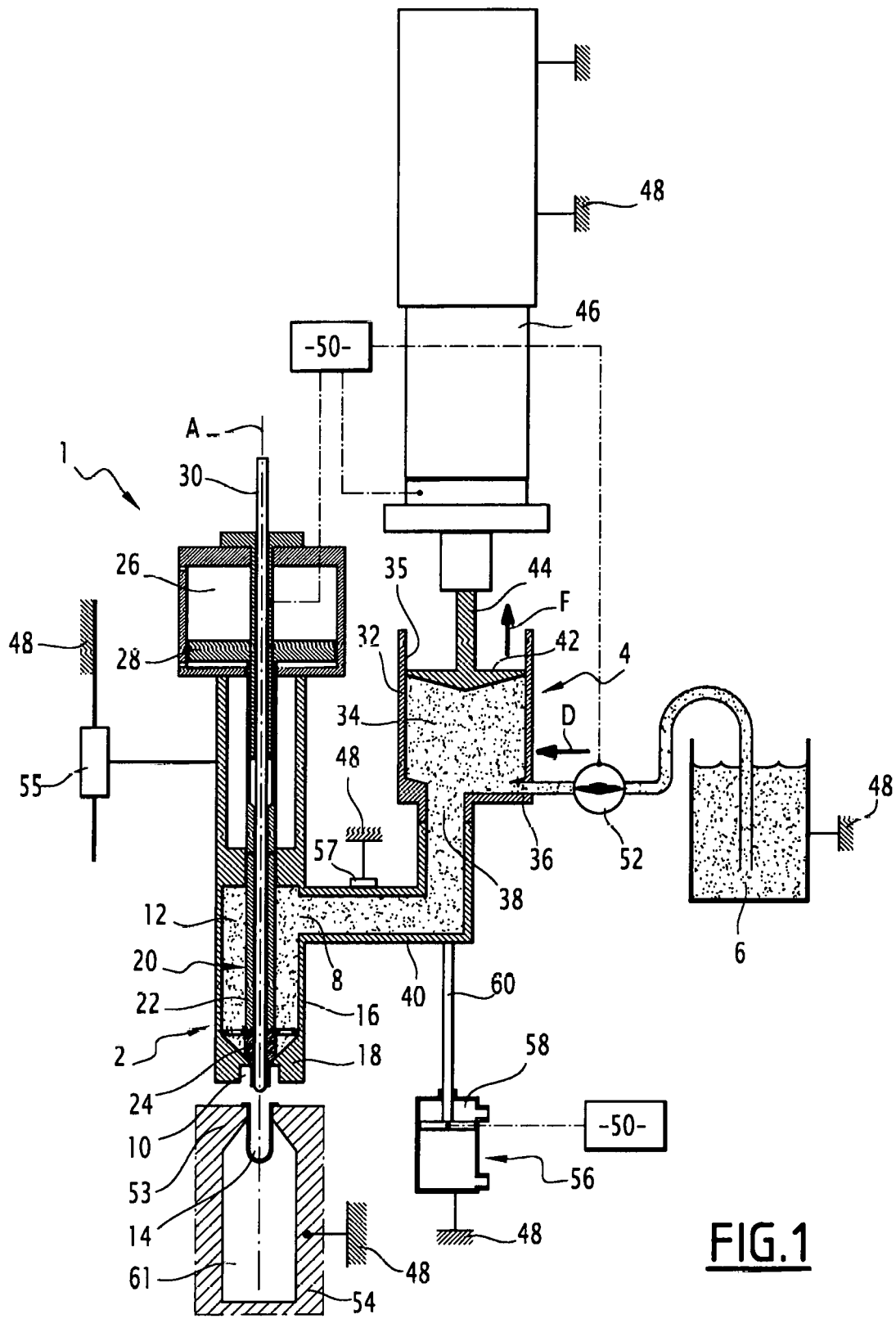
FIG. 1 is a diagrammatical axial cross-section view of an injection assembly according to a first embodiment incorporating the invention and showing the injection assembly in the retracted position.
Figure 2:
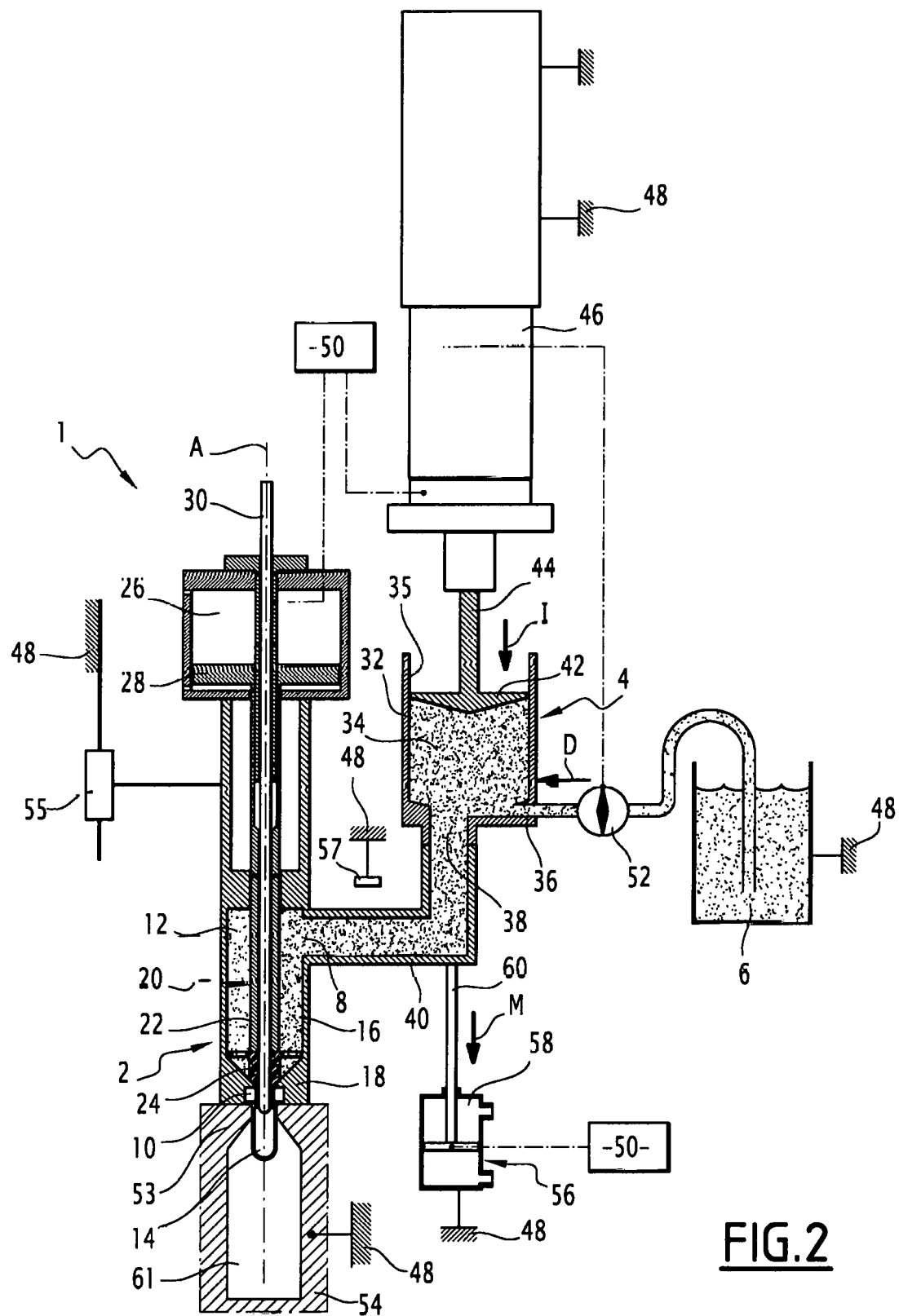
FIG. 2 is a diagrammatical axial cross-section view of the injection assembly of FIG. 1 in the displacement configuration.
Figure 3:
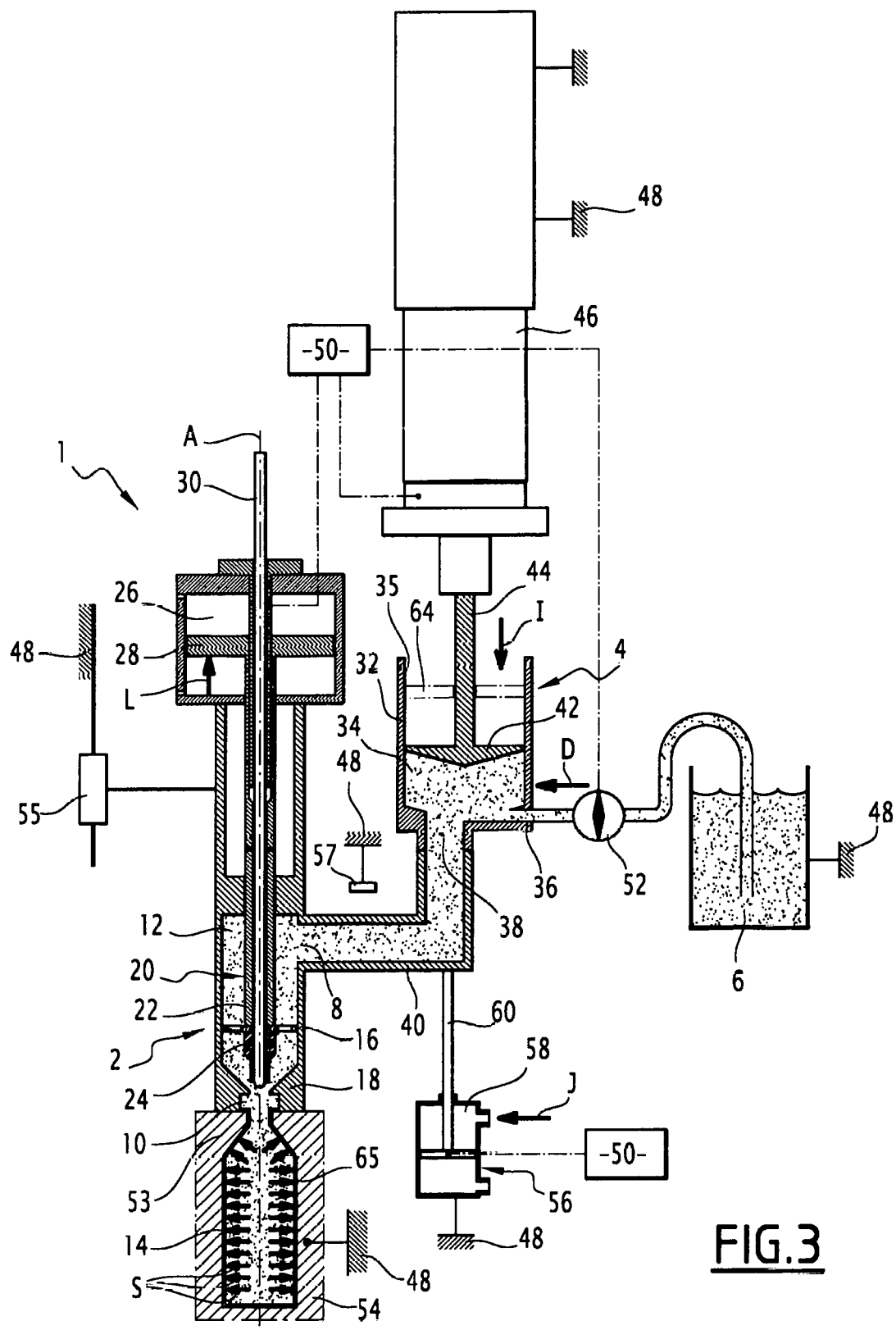
FIG. 3 is a diagrammatical axial cross-section view of the injection assembly of FIG. 1 in the injection position.

Referring to FIGS. 1 to 3, there is described a first embodiment of a station intended to be used in a machine for forming containers, such as plastics bottles and similar, from preforms using liquid products, such as water or carbonated water based drinks or other products. The station includes an injection assembly 1 comprising an injection nozzle 2, an injection device 4 and a source 6 of incompressible liquid.

The injection nozzle 2 comprises an inlet 8, an outlet 10 and a chamber 12 extending between the inlet 8 and the outlet 10 and placing the inlet 8 in fluidic communication with the outlet 10.

The inlet 8 is placed in fluidic communication with the liquid source 6, for example a water reservoir, via the injection device 4, which is adapted for transferring the liquid from the liquid source 6 to the inlet 8 and to apply pressure on the injected liquid as will be described later.

The outlet 10 is adapted to be placed in liquid tight fluidic communication with the inner volume of a preform 14 intended to be shaped into a finished container. By liquid tight fluidic communication, it is meant that when the outlet 8 is in fluidic communication with the inner volume of the preform 14, the liquid flows only in the inner volume of the preform 14 and not outside the preform.

The chamber 12 is delimited by the inner volume of a casing 16, the inlet 8 and the outlet 10 being formed by openings provided in the casing 16. The chamber 12 for example comprises a pyramidal portion or a conical portion 18 adjacent to the outlet 10, the diameter of the chamber 10 reducing progressively until it becomes equal to the diameter of the outlet 10 in the conical portion 18. Between the inlet 8 and the conical portion 18, the chamber 10 is for example substantially cylindrical with a circular section and extends along an axis A, corresponding to the axis of the preform 14, when the preform 14 is placed in the station.

The flow of liquid inside the injection assembly 1 is controlled by a valve system comprising in particular a downstream valve element 20 controlling the fluidic communication between the outlet 10 and the injection device 4.

In the embodiment shown in FIGS. 1 to 3, the downstream valve 20 is located in the injection nozzle 2 and is formed by a control rod 22 extending in the chamber 12 along axis A. The control rod 22 comprises at its lower end, extending in the chamber 12, a sealing ring 24. The sealing ring 24 has a shape which is complementary to the shape of part of the conical portion 18 of the chamber 12, such that, when the sealing ring 24 is applied against the wall of the conical portion 18, the sealing ring 24 closes hermetically the chamber 12 and prevents liquid from flowing through the outlet 10. The downstream valve 20, or control rod 22, is movable in translation along axis A in the casing 12 between an open position (FIG. 3), wherein the sealing ring 24 is spaced from the wall of the conical portion 18 and wherein the outlet 10 is in fluidic communication with the inlet 8 via the chamber 12, and a closed position (FIGS. 1 and 2), wherein the sealing ring 24 is applied against the wall of the conical portion 18 and hermetically closes the chamber 12. In the open position, the outlet 10 is therefore in fluidic communication with the injection device 4 and the valve system is in an injection state, while, in the closed position, the fluidic communication between the outlet 10 and the injection device 4 is interrupted, and the valve system is in a closed state.

The casing 16 comprises an upper compartment 26 arranged to receive actuation means for moving the control rod 22. The actuation means are for example pneumatic actuation means and for example comprise a piston 28, attached to the control rod 22 and hermetically separating the upper compartment 26 into an upper part and into a lower part, each able to be filled with air. For moving the control rod 22 between its open position and its closed position, air is injected in the upper part of the upper compartment 22 in order to increase the pressure in the upper part and to move the piston 28 such that the volume of the upper part increases, while to volume of the lower part decreases. Conversely, for moving the control rod 22 between its sealing position and its injecting position, air is injected in the lower part of the upper compartment 26 in order to increase the pressure in the lower part and to move the piston 28 such that the volume of the lower part increases, while to volume of the upper part decreases. The inner volume of the chamber 12 is hermetically isolated from the upper compartment 26 by appropriate sealing means provided between the control rod 22 and the casing 16.

According to the embodiment shown in the figures, the control rod 22 is hollow and opened at both ends, and receives a central rod 30 extending in part inside the hollow control rod 22. The central rod 30 is for example a stretch rod, which passes through the lower opening of the control rod 22 and the outlet 10 to assist in the deformation of the preform into a container, as known per se. The central rod 30 is substantially centred with respect to the axis of the control rod 22. However, a strict coaxiallity between the central rod and the control rod is possible but not required. In the vicinity of the lower opening of the control rod 22, the central rod 30 is in punctual liquid tight contact with the inner wall of the control rod 22 in order to prevent liquid from flowing inside the control rod 22.

According to the embodiment shown in the figures, the central rod 30 protrudes outside the casing 16 above the upper compartment 22. According to another embodiment, the upper part of the central rod 30 can extend inside a housing. The interior of the housing is in this case isolated from the exterior atmosphere in order to enclose the upper part of the central rod 30 in a contamination free environment.

The central rod 30 is movable in translation along axis A in the hollow control rod 16 and is actuated by appropriate actuation means. The use of such a central rod 30, as a stretch rod, in conjunction with the use of the control rod 22 to form containers from preforms, is known and will not be described in greater detail herein. It should be noted however, that during the movement of the central rod 30 for forming containers, it remains in punctual liquid tight contact with the inner wall of the control rod 22. The liquid tight contact between the central rod 30 and the inner wall of the control rod 22 can however be removed for cleaning the central rod 30 and the inner wall of the control rod 22.

According to the embodiment shown in the figures, the injection device 4 comprises a housing 32 defining a main chamber 34, comprising an inlet 36 and an outlet 38. The inlet 36 is in fluidic communication with the liquid source 6, for example via a pipe. The outlet 38 is in fluidic communication with the inlet 8 of the injection nozzle 2; for example via a pipe. The housing 32 comprises an actuation aperture 35, which extends in the upper part of the housing 32 between the inlet 36 and the outlet 38.

The pipe connecting the outlet 38 of the injection device 4 and the inlet 8 of the injection nozzle 2 is for example formed by a rigid duct 40. According to an embodiment, the rigid duct 40 is made in a single piece with the casing 16 of the injection nozzle 2. According to another embodiment, the rigid duct could be made in a single piece with the housing 32 of the injection device 4 or made as a separate piece from the casing 16 and housing 32. The connection between the rigid duct 40 and the inlet 8 of the injection nozzle 2 and/or the outlet 38 of the injection device 4 is a fluid tight connection. To this end, the rigid duct 40 can for example be welded to the casing 16 of the injection nozzle 2 and/or to the housing 32 of the injection device 4. Such a rigid connection between the injection nozzle 2 and the injection device 4 allows circulating the liquid in the injection assembly at a high pressure, for example around 40 bars.

The injection device 4 further comprises a closing element 42 closing the main chamber 34 in a fluid tight manner, such that the liquid flowing in the chamber 34 via the inlet 36 can exit the chamber 34 only through the outlet 38. By closing the main chamber 34, it is meant that the closing element 42 is arranged to close the actuation aperture 35. The closing element 42 is movable inside the housing 32 in an injection direction, represented by arrow I wherein the volume of liquid inside the main chamber 34 decreases, and in a filling direction, represented by arrow F, wherein the volume of the main chamber 34 increases. The fluid tight closing of the chamber 34 is maintained during the movement of the closing element 42. The movement of the closing element 42 is controlled by an actuator 44.

According the embodiments shown in the figures, the closing element 42 is formed by a rigid piston movable in translation relative to the housing 32 in the axial direction and in fluid tight contact with the wall of the housing 32 via appropriate sealing means. The actuator 44 is then formed by an actuation rod attached to the side of the rigid piston opposite the main chamber 34 and movable in translation according to the axial direction. The rod is for example part of a hydraulic jack 46 or the like, operable to move the rod in the injection direction and in the filling direction. In a variant, the rod could be operable with other means, such as a servo motor. The means for operating the rod are attached to a main body 48 of the station or are part of the main body 48, relative to which the injection nozzle 2 and the injection device 4 are movable, as will be described later.

The movement of the actuator 44 and the operation of the valve system are controlled by control means 50, arranged in particular to initiate, control and synchronise the movement of the downstream valve 20 between the open position and the closed position and the movement of the actuator 44 in the injection direction and in the filling direction.

According to the embodiment shown in the figures, the valve system further comprises an upstream valve element 52, controlling the flow of liquid between the liquid source 6 and the inlet 36 of the housing 32 of the injection device 4. The upstream valve element 52 is for example an actuable valve movable between an open position, placing the liquid source in fluidic communication with the main chamber 34, and a closed position, interrupting the fluidic communication between the liquid source 6 and the main chamber 34. The movement of such an actuable valve is then controlled and synchronised by the control means 50.

Figure 4:
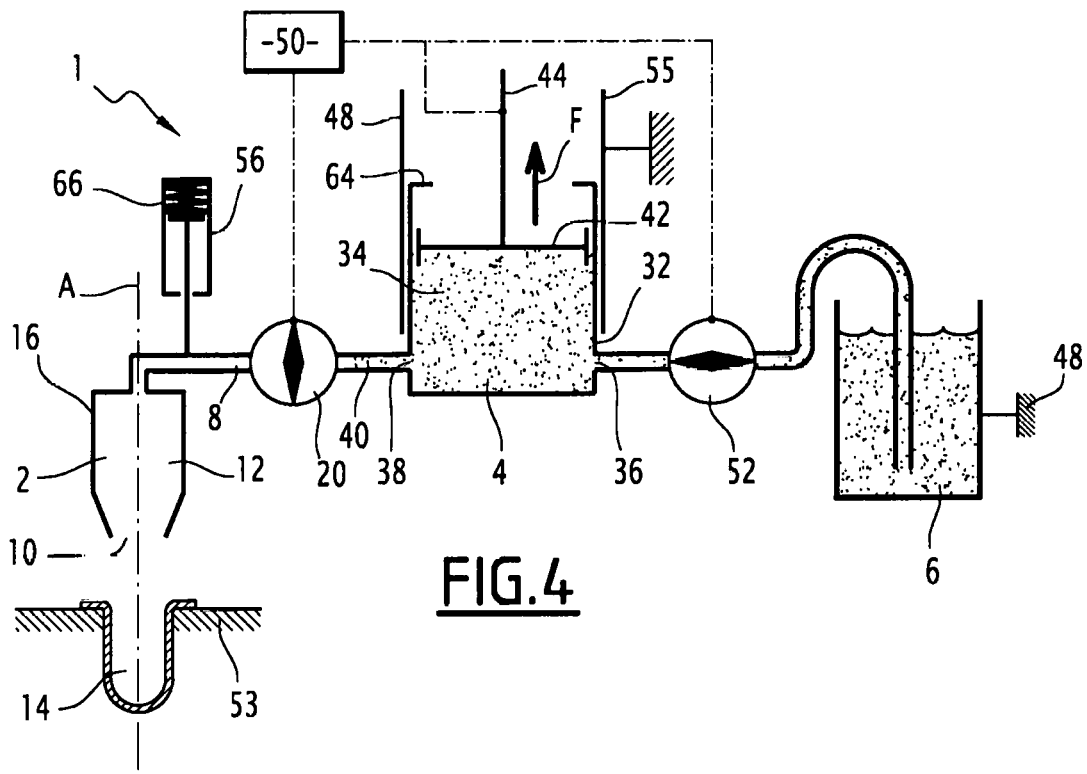
FIG. 4 is diagrammatical axial cross-section view of an injection assembly according to a second embodiment incorporating the invention and showing the injection assembly in the retracted position.
Figure 5:
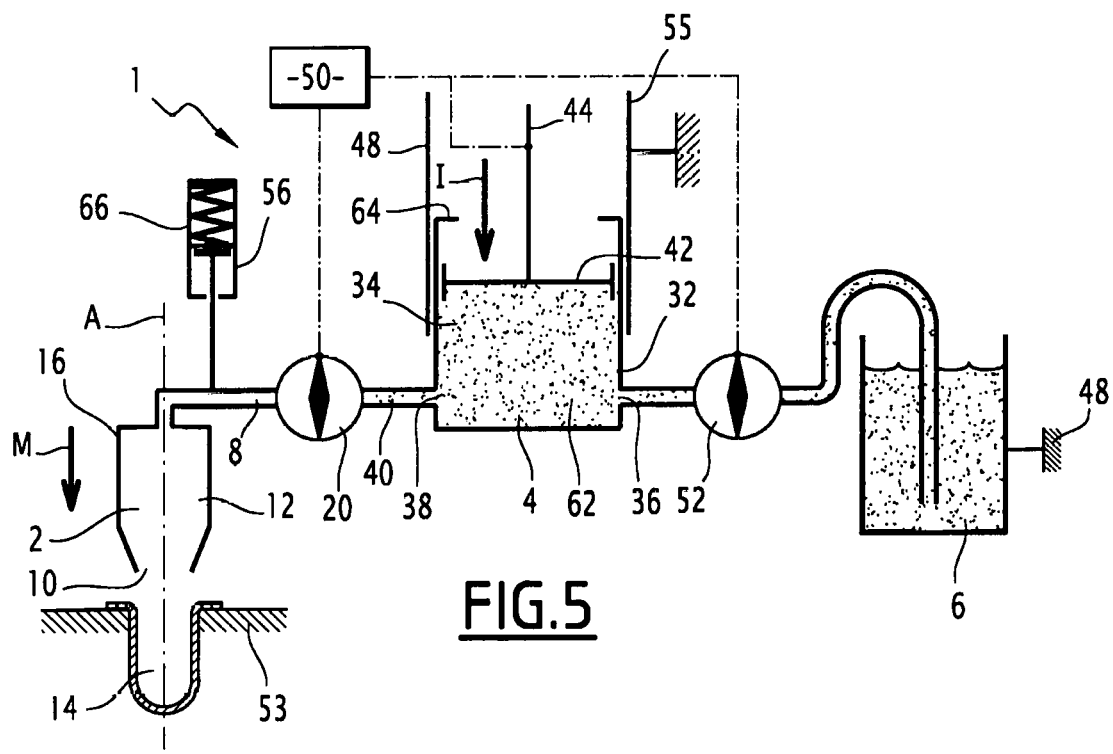
FIG. 5 is a diagrammatical axial cross-section view of the injection assembly of FIG. 4 in the displacement configuration.
Figure 6:
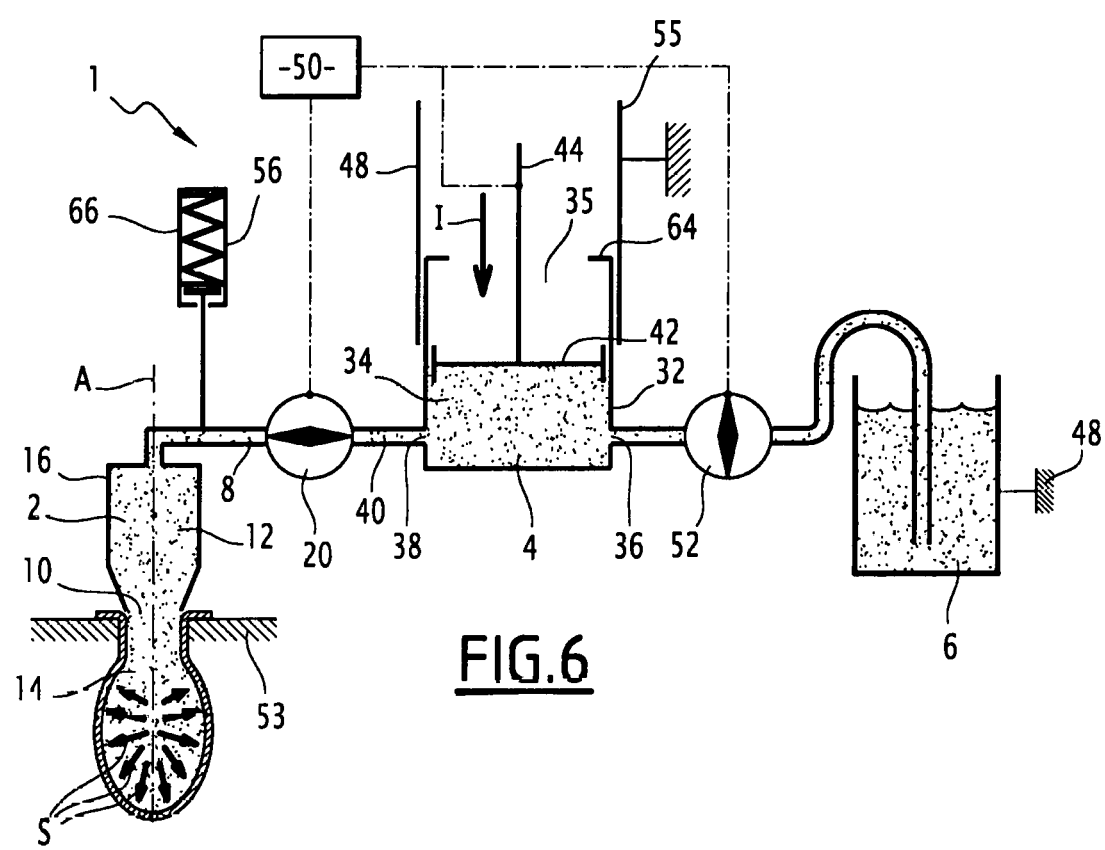
FIG. 6 is a diagrammatical axial cross-section view of the injection assembly of FIG. 4 in the injection position.

As mentioned previously, the injection nozzle 2 and the injection device 4 are movable relative to the main body 48. More particularly, the injection nozzle 2 and the injection device 4 are movable in translation between a retracted position (FIG. 1), wherein the preform 14 can be placed under the outlet 8 of the injection nozzle 2 in the station, and an injection position (FIGS. 2 and 3), wherein the injection nozzle 2 is lowered such that the outlet 8 is placed in fluid tight fluidic communication with the preform 14. To this end, the main body 48 further comprises a preform seat 53 arranged to maintain the preform 14 inside the station. The preform seat 53 can be formed by a mould 54, as shown in the embodiment of FIGS. 1 to 3, or by a simple support, as shown in the embodiment of FIGS. 4 to 6. The movement of the injection assembly 1 relative to the main body 48 is guided by appropriate guiding means 55, such as rails provided on the main body 48 on which the injection nozzle 2 and/or the housing 32 are displaceable or a carrier attached to injection assembly and movable along a guiding rod attached to the main body 48. The liquid source 6 can be attached to the main body 48 and not be movable with the rest of the injection assembly. In this case, the liquid source 6 is connected to the upstream valve element 52 by a flexible duct or the like which allows the injection assembly to move relative to the liquid source 6 without interrupting the fluidic communication between the liquid source 6 and the upstream valve element.

The injection assembly further comprises maintaining means 56 for maintaining the injection nozzle 2 and the housing 32 of the injection device 4 in the injection position and, possibly, in the retracted position. According to the embodiment shown in FIGS. 1 to 3, the maintaining means are formed by a pneumatic or hydraulic jack 58 having a rod 60 movable relative to a fixed part attached to the main body 48. The rod 60 is attached to the injection assembly 1, for example the duct 40, and its movement is at least controlled to maintain the injection assembly 1 in the injection position. It can also be used to maintain the injection assembly in the retracted position and/or to assist the displacement of the injection assembly 1. The operation of the jack 56 is controlled by the control means 50 in synchronization with the control of the actuator 44.

The movement of the injection assembly 1 is controlled by the actuator 44 actuating the closing element 42; as will now be described in relation with the functioning of the injection assembly and the forming station described above for forming a container from a preform 14.

All the operations described below are controlled by the control means 50, which are formed by appropriate means for performing the controls, such as a memory which stores time profile data allowing the synchronisation of the movements of the various movable parts of the injection assembly and/or sensors for detecting the positions of the various movable parts and one or several regulation loops connected to one or several of these sensors.

In an initial step, the injection assembly 1 is placed in the retracted position, leaving room under the injection nozzle 2 to place a preform which is, in a known manner, placed in the mold 54 defining a molding cavity 61 having the shape of the container to be produced. The preform 14 has for example been previously heated at a temperature above the preform material glass transition temperature. The station comprises means for placing the preform in the mold 54 under the outlet 8 of the injection nozzle 2, as known per se. The valve system is operated to be in a filling state wherein the main chamber 34 of the injection device 4 can be filled with liquid. In this state, the downstream valve element 20 is in closed position, meaning that the sealing ring 24 of the control rod 22 is applied against the wall of the conical portion 18 and hermetically closes the chamber 12. If the upstream valve element 52 is an actuable valve, it is placed in open position to allow the liquid to flow from the liquid source 6 to the main chamber 34. In this state, the closing element 42 is moved in the filling direction, while the injection assembly is maintained in the retracted position, for example by the maintaining means 56 or by a retraction stop 57, causing liquid to be drawn in the main chamber 34 and in the chamber 12 of the injection nozzle 2 until the chambers and the duct 40 extending between the chambers are filled with liquid, as shown by arrow D in FIG. 1.

Once the main chamber 34 and chamber 12 are filled with liquid, the control means 50 place the valve system into a closed state, wherein the downstream valve element 20 is in closed position and, if the upstream valve element 52 is an actuable valve, the upstream valve element 52 is also in closed position, such that a liquid tight closed volume 62 (FIG. 2) is formed between the downstream valve element 20 and the upstream valve element 52. The closed volume 62 is delimited by the valve system and by the closing element 42 and is filled with incompressible liquid. Consequently, by actuating the actuator 44 in the injection direction, the closing element 42 applies a pressure on the liquid, which can not be compressed, and which causes the whole closed volume to be displaced in the axial direction, meaning that the housing 32 of the injection device 4 and the injection nozzle 2 are moved as a single unit towards the injection position as shown by arrow M in FIG. 2. Consequently, when the valve system is in closed state and the closed volume 62 is filled with liquid, the station is operable in a displacement configuration, or during a displacement phase, wherein actuating the actuator 44 causes the injection assembly to move from the retracted position to the injection position or vice versa.

In the injection position, the outlet 10 of the injection nozzle 2 is in fluidic communication with the inner volume of the preform 14. The valve system is then placed in an injection state, wherein the downstream valve element 20 is placed in open position, meaning that the control rod 22 is lifted, as shown by arrow L in FIG. 3. The injection assembly is then operable in an injection configuration or during an injection phase, wherein the actuating the actuator 44 in the injection direction causes the closing element 42 to push on the liquid in the main chamber 34 such that the liquid flows towards the chamber 12 of the injection nozzle 2 and fills the inner volume of the preform 14 through the outlet 8, as shown in FIG. 3. Under the pressure of the liquid injected in the preform, the preform is deformed such that it acquires the shape of the molding cavity, as shown by arrows S in FIG. 3. During the injection phase, the central rod 30 can be moved as known per se to assist the axial deformation of the preform. Such a forming step is known and will not be described in greater detail herein. During the injection phase, the injection assembly is firmly maintained in the injection position by the maintaining means 56, by injecting a pressurized fluid in the jack 58, as shown by arrow J in FIG. 3. The pressurized fluid can be injected just before the downstream valve element 20 is placed in the open position. In this manner, it is guaranteed that the injection assembly will remain in the injection position when the downstream valve element 20 is opened and the liquid starts flowing in the preform at a high pressure. Risks of spilling the liquid outside the preform are therefore avoided.

Once the injection step, or forming step as described above, is completed, the downstream valve element 20 is placed in closed position and the actuator 44 is actuated in the filling direction while the upstream valve 52 is still closed. Therefore, the actuator 44 pulls the whole assembly including of the injection nozzle 2 and the housing 32 because the liquid in the closed volume does not includes significant gaseous bubbles. The displacement phase extends from the injection position to the retracted position where the injection assembly 1 is urged against the retracted stop 57. Then, the upstream valve element 52 is open and the closing element 42 continues to move in the filling direction. This movement causes the main chamber 34 and the chamber 12 of the injection nozzle to be filled.

In a variant, the filling of the main chamber 34 could take place while the injection nozzle is in the injection position and is maintained in that position by the maintaining means 56. When the closing element 42 comes into contact with an upper wall 64 of the housing 32 of the injection device 4, (illustrated in dotted line as a variant in FIG. 3), further actuation in the filling direction, will cause the closing element 42 to lift the injection assembly in the retracted position since the closing element 42 is in abutment against the upper wall 64. Alternatively, the movement of the injection assembly towards the retracted position can be controlled by actuating the maintaining means 56, or the movement can be assisted by the maintaining means 56.

The shaped container 65 can then be retrieved from the station and a new preform can be placed in the station. The above steps are then repeated to shape a new container.

When the injection assembly has to been cleaned, the outlet 8 of the injection nozzle 2 is connected to means for collecting cleaning products flowing through the injection assembly 1, such as a dummy container, and the liquid source 6 is replaced by a source of cleaning products, meaning that the inlet 36 of the injection device 4 is placed in fluidic communication with a source of cleaning products, for example a cleaning solution. The above described steps are then performed such that the cleaning products flow in the injection assembly 1 from the cleaning products source to the dummy container and clean the whole injection assembly. Consequently, the whole injection assembly can be cleaned in a single injection step as disclosed above, without needing to stop the machine or to dismantle the injection assembly. In a known manner, the dummy container can be connected to the source of cleaning products in order to form a close circuit for circulating the cleaning products through the injection assembly 1.

A second embodiment of the injection assembly will now be described in relation to FIGS. 4 to 6. In these figures, the elements which are the same as in the first embodiment are designated by the same numeral references.

The main difference between the second embodiment and the first embodiment is that the downstream valve element 20 is placed between the outlet 38 of the main chamber 34 of the injection device 4 and the inlet 8 of the injection nozzle 2 and can be a simple actuable valve movable between an open position and closed position. In this embodiment, the structure of the injection nozzle 2 is therefore simpler than in the first embodiment and the closed volume 64 is smaller than in the first embodiment since the closed volume 64 does not include the chamber 12 of the injection nozzle, as shown in FIG. 5.

The maintaining means 56 are also modified and for example comprise a stress element 66 arranged to urge the injection nozzle 2 towards the injection position, which provides a particularly stable injection position, even under a large pressure of liquid injected through the nozzle.

The functioning of the injection assembly 1 according to the second embodiment is the same as the operation of the injection assembly according to the first embodiment and will not be described again.

Other variants of the injection assembly 1 can be contemplated without departing from the scope of the invention.

For example, the closing element 42 could be formed by an elastic membrane, closing the actuation aperture 35 of the main chamber 34 and attached in a fluid tight manner to the wall of the housing 32. Such an elastic membrane is arranged to be deformed in the injection direction, for example by applying a pressure on the side of the elastic membrane opposite to the side facing the main chamber 34. The pressure can be applied by compressed air for example. In this case, the elastic membrane can be used to perform the displacement of the injection assembly towards the injection position and to perform the injection step, while the displacement of the injection assembly towards the retracted position can be performed by maintaining means as described in the first embodiment or by a stress element arranged to urge the injection assembly towards the retracted position when the elastic membrane is no longer subjected to a pressure.

The valve system could also be formed by a three-way valve arranged between the outlet 38 of the main chamber 34 and the inlet of the injection nozzle 2. The three-way valve would then be operable between a closed circuit state, wherein the outlet 38 of the main chamber 34 is in fluidic communication with the inlet 36 of the main chamber, and an injection state, wherein the outlet 38 of the main chamber 34 is in fluidic communication with the inlet 8 of the injection nozzle 2. To operate the injection assembly in the displacement configuration, the three-way valve is placed in the closed circuit state, wherein a closed volume is formed between the three-way valve and the inlet of the main chamber 34.

The injection assembly and the station described above have been described as being used to form a container from a preform. However, it should be noted that the injection assembly and the station could also be used to fill a container without a deformation step.

It should be understood that the terms "upper" and "lower", "above" and "under" have been used for an injection device arranged to inject a fluid in a container placed under the injection device. The invention could also be applied in the same manner to an injection device arranged to inject a fluid in a container placed above the injection device. In this case, in the above description, the term "upper" should be exchanged with the term "lower" and the term "above" should be exchanged with the term "under". It should also be understood that the injection device can be used with an axis A which is not vertical. That is for example the case when the injection device is implemented in a station being part of a rotary machine.

The invention claimed is:

1. A station for forming a container from a preform, the station comprising:
    a main body, the main body including a preform seat adapted to receive the preform; and
    an injection assembly, the injection assembly including
    an injection nozzle having an inlet and an outlet, the injection nozzle being movable between a retracted position and an injection position relative to the preform seat, the outlet being in fluidic communication with the preform when the injection nozzle is in the injection position, and
    an injection device arranged to inject liquid from a liquid source to the inlet of the injection nozzle, the injection device comprising a housing defining a main chamber having an actuation aperture, and a closing element movable relative to the housing and closing the actuation aperture in a fluid tight manner,
    a valve system, operable by a controller, in a closed state, wherein the fluidic communication between the outlet and the main chamber is interrupted such that the main chamber, the closing element and the valve system in the closed state delimit a closed volume,
    wherein the injection nozzle and the housing of the injection device are rigidly fixed to each other such as to form a single unit movable between the retracted position and the injection position, the station further comprising an actuator fixed relative to the main body and coupled to the closing element to move the closing element with respect to the main body, the controller being configured to place the station in a displacement configuration wherein the valve system is in the closed state and the closed volume is filled with liquid, the closing element being fixed by the closed volume relative to the housing and the injection nozzle and the actuator being coupled by the closing element to the single unit of the housing and the injection nozzle whereby movement between the retracted and injection positions is effectuated by the actuator.

2. The station according to claim 1, wherein the valve system is further operable by the controller between at least:
    a filling state arranged to place the main chamber in fluidic communication with the liquid source such as to fill the main chamber with the liquid, an injection state, arranged to place the main chamber in fluidic communication with the outlet of the injection nozzle, and the closed state.

3. The station according to claim 2, further comprising a retraction stop defining the retracted position of the injection nozzle, the controller being able to put the station in a filling configuration, wherein the valve system is in the filling state, the injection nozzle is urged against the retraction stop and the actuator moves the closing element in a filling direction causing the main chamber to be filled with liquid from the liquid source.

4. The station according to claim 1, further comprising a maintaining jack configured to maintain the injection nozzle and the housing of the injection device in the injection position, the controller being able to put the station in an injection configuration wherein the valve system is in the injection state, the maintaining jack is actuated and the actuator moves the closing element in an injection direction.

5. The station according to claim 1, wherein the valve system comprises a downstream valve element located between the inlet of the injection nozzle and an outlet of the main chamber or located inside the injection nozzle, the downstream valve element being an actuable valve operable by the controller.

6. The station according to claim 1, wherein the valve system comprises an upstream valve element, located between the liquid source and an inlet of the main chamber of the injection device, the upstream valve element being an actuable valve operable by the controller.

7. The station according to claim 1, wherein the closing element is formed by a rigid piston that is arranged to slide in the actuation aperture.

8. The station according to claim 1, wherein the closing element is formed by an elastic membrane.

9. The station according to claim 1, further comprising guiding means for guiding the movement of the injection nozzle and of the housing relative to the main body.

10. A method for forming a container from a preform using a station according to claim 1, the method comprising:
providing the station according to claim 1;
introducing a preform into the preform seat while the injection nozzle is in the retracted position;
moving the injection nozzle into the injection position;
placing the valve system in the closed state; and
actuating the actuator to move the closing element and causing the injection nozzle and the injection device to be moved simultaneously.

11. The method according to claim 10, including the step of placing the valve system in a filling state and moving the closing element in a filling direction such that the closed volume is filled with liquid.

12. The method according to claim 10, including the step of, after moving the injection nozzle into the injection position, maintaining the injection nozzle in the injection position such that the outlet of the injection nozzle is maintained in fluidic communication with the preform, and while maintaining the injection nozzle in the injection position,
placing the valve system in an injection state, and
then, moving the closing element in an injection direction such that liquid is injected from the main chamber to the preform through the outlet.

13. The method according to claim 12, wherein, prior to the preform being introduced into the preform seat, heating the preform to a temperature above a glass transition temperature of the preform, and wherein moving of the closing element includes exerting a force on the closing element strong enough to generate a liquid pressure suitable for deforming the preform heated to the temperature above the glass transition temperature.

* * * * *